G. A. ROBINSON.
VALVE CONTROLLED DEVICE FOR DRAWING LIQUIDS.
APPLICATION FILED MAY 19, 1910.

976,398.

Patented Nov. 22, 1910.

Witnesses:
R. Wallace
John H. Parker

Inventor:
George A. Robinson
by Macleod, Calver, Copeland & Dike
attorneys

UNITED STATES PATENT OFFICE.

GEORGE A. ROBINSON, OF BOSTON, MASSACHUSETTS, ASSIGNOR TO PNEUMATIC SCALE CORPORATION LIMITED, OF QUINCY, MASSACHUSETTS, A CORPORATION OF MAINE.

VALVE-CONTROLLED DEVICE FOR DRAWING LIQUIDS.

976,398.     Specification of Letters Patent.     Patented Nov. 22, 1910.

Application filed May 19, 1910. Serial No. 562,200.

*To all whom it may concern:*

Be it known that I, GEORGE A. ROBINSON, a citizen of the United States, residing at Boston, in the county of Suffolk and State of Massachusetts, have invented a certain new and useful Improvement in Valve-Controlled Devices for Drawing Liquids, of which the following is a specification, reference being had therein to the accompanying drawings.

The object of the invention is to provide means for controlling the flow of liquids or semi-liquids from a reservoir to a receptacle in which the liquid is to be put up, the special object of the invention being to provide such a device for use where it is desired that the flow shall be by a small stream which can be quickly opened and quickly closed.

It is especially intended for use in connection with a machine for putting up such liquids or semi-liquids in cans or other receptacles for the market in which the receptacle is partially or nearly filled by a larger stream and the receptacle is then transferred to another position where it is desired to add a small additional quantity to bring the full amount up to a certain measure or a certain weight.

It is also especially adapted to be used in connection with such a filling machine in which the said drip stream is shut off by the tipping of the scale when a certain predetermined weight of the material has been deposited in the receptacle which is being filled, although it is not intended to be limited to use with a weighing machine, and it is intended that the scope of the claims shall be broad enough to cover the use of the device for any purpose to which it is adapted.

The invention will be fully understood from the following description taken in connection with the accompanying drawings, and the novel features are pointed out and clearly defined in the claims at the close of the specification.

Figure 1:
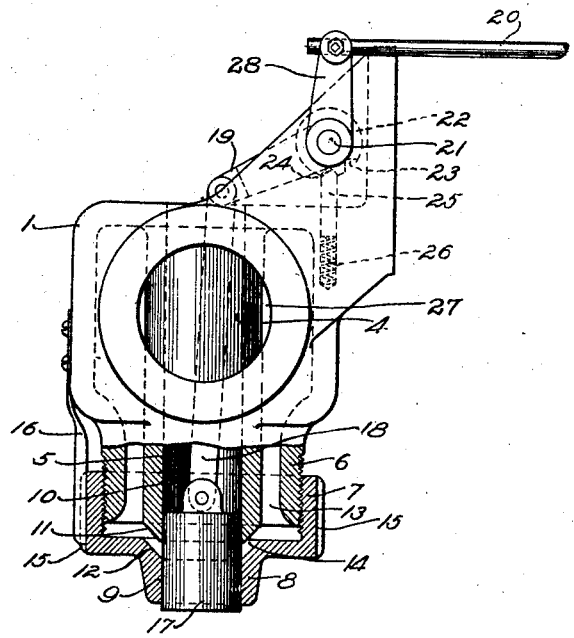
Figure 2:
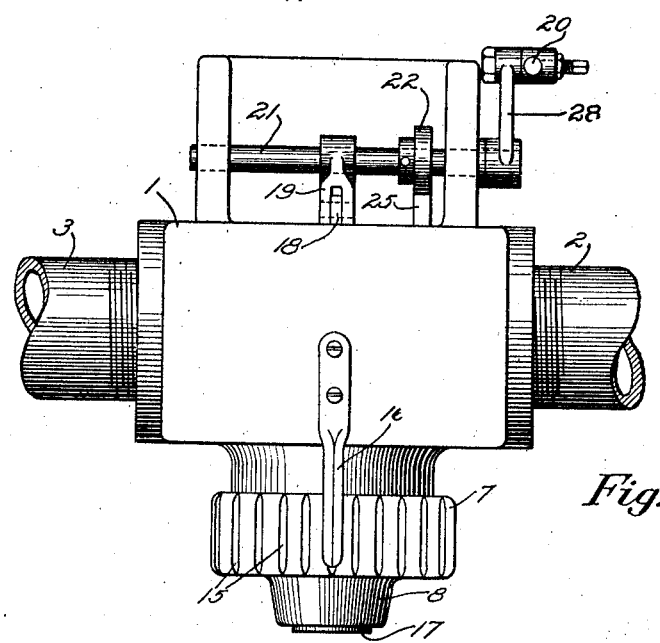

In the drawings,—Figure 1 is a side elevation, partly in section, of a device embodying the invention. Fig. 2 is a front elevation.

Referring now to the drawings,—1 is a valve-body, preferably of cast metal, cored out on the inside and having one opening with which an inlet pipe 2 connects from a reservoir, not shown, which supplies the material and having another opening with which an outlet pipe 3 is connected which serves as a return pipe back to the reservoir.

When the material which is being put up is lard or similar material, which is in a liquid or semi-liquid form when hot and stiffens when cool, it is necessary to put it up when in its melted condition, and it is kept constantly hot in the reservoir. If, after it passes from the reservoir into the pipe 2 and into the valve-body 1, it were allowed to stand without flowing for any length of time, it would become too thick to flow readily through the valve. In order, therefore, to keep the liquid in continuous circulation so that if the valve is closed it may be returned back to the reservoir, the return pipe 3 above mentioned is provided.

The valve-body 1 is formed or provided with a tube-shaped downward projection 4 extending from the top of the valve-body down through the interior of the valve-body to the lower end thereof, said tube 4 being open at the top and bottom and forming a piston-chamber 5. The lower part of the valve-body terminates in a cylindrical neck-portion 6 which is open at the lower end. Said neck 6 is threaded exteriorly. A cap 7, screw-threaded on its inner periphery, screws onto the threaded portion of the neck 6 and terminates in its lower end in a nozzle 8 whose inner end 12 is beveled. The inner periphery 9 of the nozzle 8 is exactly in alinement with the inner periphery 10 of the tube 4. The lower end of the tube 4 is formed with a beveled edge 11 which is beveled at the same angle as the beveled edge 12 of the inner end of the nozzle 8. The cap 7 is adapted to be screwed up onto the threaded end of the neck 6 far enough for the beveled edge 12 of the nozzle to become seated upon the beveled edge 11 of the tube 4 and thereby to entirely close the passage from the chamber 5 in the tube 10 to the chamber 13 between the outer periphery of the tube 4 and the wall of the body of the valve, or the cap 7 may be unscrewed sufficiently to open a passage, as 14, from the chamber 13 to the chamber 5. The width of the passage 14 may be varied by screwing the cap up or down. In order to maintain the cap 7 in its adjusted position, either entirely closing the passage 14 or with the passage 14 open, the cap 7 is provided with a series of notches 15 in its periphery with which a spring latch 16 attached to the body of the valve is adapted to be engaged.

When the apparatus is in operation, the passage 14 will always be kept open more or less according to the size of the stream desired. If at any time it is desired to remove the piston 17 for the purpose of repairs to the piston or to other parts within the chamber 5 without entirely drawing off the liquid that is in the chamber 13, the cap 8 then will be screwed up to entirely close the passage 14.

Slidably fitted into the chamber 5 of the tube 4 is a piston 17 which is connected with a rod 18, the upper end of said rod 18 being connected with a lever 19 mounted fast on shaft 21. A lever 28 mounted fast on said shaft is connected with a rod or lever 20 whereby the piston 17 may be raised or lowered. This rod 20 may be operated by hand, or may be connected with mechanism for actuating it automatically, as for instance with the scale-beam of a weighing machine so that the tipping of the scale-beam will actuate the piston.

When the piston 17 is in the position shown in the drawings, the passage 14 from the chamber 13 is closed. When the piston 17 is raised, so as to open the passage 14 to the nozzle 8, the liquid which at all times fills the chamber 13, by means of the inlet pipe 2, will pass out through the nozzle into any receptacle which may be placed beneath the nozzle to receive it. As soon as the piston 17 descends to cover the passage 14, the supply will be shut off. As stated above, this may be done by hand through the rod 20, or if it is connected with a weighing machine, it is obvious that it may be so connected that the tipping of the scale will move the rod 20 in such a manner as to carry the piston 17 down into position to shut off the flow.

In order to hold the valve 17 positively in its open or closed position when raised or lowered by the lever 19, however the lever may be operated, means are provided for automatically locking the said lever in its open or closed position, as the case may be. The means shown are as follows: Mounted fast on the rockershaft 21, to which the lever 19 is made fast, is a disk 22 formed with two notches 23, 24, spaced apart equal to the arc of movement of the disk in the two extreme positions of the lever; that is when the valve 17 is in its most elevated and lowermost positions. A pin 25, having a wedge-shaped upper end adapted to engage with said notches 23, 24, is seated upon a spring 26 in a socket in the valve-body 1. When a slight pressure is applied to move the rod longitudinally, such force for instance as might be imparted by the tipping of the scale, the rockershaft 21 will be turned, and the lever 19 will be moved. The beveled face of the notches 23 or 24, within which the wedge end of the pin 25 is engaged, will allow the disk 22 and the rockershaft 21 to turn, the pin 25 yielding by its downward pressure upon the spring 26 and as soon as the disk is turned far enough for the wedge end of the pin 25 to reach the other notch, the pin will snap into said second notch and hold the rockershaft 21 and lever 19 and thereby the valve 17 in its new position until sufficient force is exerted to overcome the tension of the spring 26 to release it from the notch.

What I claim is:—

1. A valve-controlled device for drawing liquid from a reservoir comprising a hollow valve-body having a tubular connection with the reservoir, said valve-body having an opening at the top connected with a tube which extends downward through the chamber of said valve-body, a cap secured to the lower end of said valve-body having a nozzle which has an opening in alinement with the passage through said tube in the valve-body, said cap being adapted to be secured to the valve-body in such manner as to leave a passage into the nozzle from the chamber of the valve-body surrounding said tube between the adjacent ends of said tube and nozzle and a valve movable within said tube and nozzle which is adapted to close and open said passage.

2. A valve-controlled device for drawing liquid from a reservoir comprising a hollow valve-body having a tubular connection with the reservoir, said valve-body having an opening at the top connected with a tube which extends downward through the chamber of said valve-body, a cap secured to the lower end of said valve-body having a nozzle which has an opening in alinement with the passage through said tube in the valve-body, said cap being adapted to be secured to the valve-body in such manner as to leave a passage into the nozzle from the chamber of the valve-body surrounding said tube between the adjacent ends of said tube and nozzle and a valve movable within said tube and nozzle which is adapted to close and open said passage from the nozzle to said outer chamber of the valve-body and means for actuating said valve.

3. A valve-controlled device for drawing liquid from a reservoir comprising a hollow valve-body having a tubular connection with the reservoir, said valve-body having an opening at the top connected with a tube which extends downward through the chamber of said valve-body, a cap secured to the lower end of said valve-body having a nozzle which has an opening in alinement with the passage through said tube in the valve-body, said cap being adapted to be secured to the valve-body in such manner as to leave a passage into the nozzle from the chamber of the valve-body surrounding said tube between the adjacent ends of the tube and nozzle, a valve movable within said tube and nozzle which is adapted to close and open said passage from the nozzle to said outer chamber of the valve-body, means for actuating said valve and means for locking said valve in its open or closed position.

4. A valve-controlled device for drawing liquid from a reservoir comprising a hollow valve-body having a tubular connection with the reservoir, said valve-body having an opening at the top connected with a tube which extends downward through the chamber of said valve-body, a cap secured to the lower end of said valve-body having a nozzle which has an opening in alinement with the passage through said tube in the valve-body, said cap being adapted to be secured to the valve-body in such manner as to leave a passage into the nozzle from the chamber of the valve-body surrounding said tube, a valve movable within said tube and nozzle which is adapted to close and open said passage from the nozzle to said outer chamber of the valve-body, means for actuating said valve, said cap having a screw-thread connection with said valve-body, said tube having its lower end beveled and said nozzle having its interior upper end beveled to correspond with the bevel on said tube whereby a beveled joint is formed when the cap is screwed up to bring the beveled edges of the nozzle into contact with the beveled edges of the tube.

5. A valve-controlled device for drawing liquid from a reservoir comprising a hollow valve-body having a tubular connection with the reservoir, said valve-body having an opening at the top connected with a tube which extends downward through the chamber of said valve-body, a cap secured to the lower end of said valve-body having a nozzle which has an opening in alinement with the passage through said tube in the valve-body, said cap being adapted to be secured to the valve-body in such manner as to leave a passage into the nozzle from the chamber of the valve-body surrounding said tube, a valve movable within said tube and nozzle which is adapted to close and open said passage from the nozzle to said outer chamber of the valve-body, means for actuating said valve, said cap having a screw-thread connection with said valve-body, whereby the said cap may be adjusted to vary the size of the passage from the chamber of the valve-body into the nozzle.

6. A valve-controlled device for drawing liquid from a reservoir comprising a hollow valve-body having a tubular connection with the reservoir, said valve-body having an opening at the top connected with a tube which extends downward through the chamber of said valve-body, a cap secured to the lower end of said valve-body having a nozzle which has an opening in alinement with the passage through said tube in the valve-body, said cap being adapted to be secured to the valve-body in such manner as to leave a passage into the nozzle from the chamber of the valve-body surrounding said tube, a valve movable within said tube and nozzle which is adapted to close and open said passage from the nozzle to said outer chamber of the valve-body, means for actuating said valve, said cap having a screw-thread connection with said valve-body, said tube having its lower end beveled and said nozzle having its interior upper end beveled to correspond with the bevel on said tube whereby a beveled joint is formed when the cap is screwed up to bring the beveled edges of the nozzle into contact with the beveled edges of the tube, and means for locking the said cap in its adjusted position.

7. A valve-controlled device for drawing liquid from a reservoir comprising a hollow valve-body having a tubular connection with the reservoir, said valve-body having an opening at the top connected with a tube which extends downward through the chamber of said valve-body, the said chamber being of larger diameter than said tube, the lower end of said valve-body being formed with a cylindrical neck screw-threaded on its exterior, a screw-cap screwed onto the said neck and having a nozzle whose inner periphery is in alinement with the inner periphery of the said tube.

8. A valve-controlled device for drawing liquid comprising a hollow valve-body having a tubular connection with a reservoir, said valve-body having an opening at the top connected with a tube which extends downward through the chamber of said valve-body, the said chamber being of larger diameter than said tube, the lower end of said valve-body being formed with a cylindrical neck screw-threaded on its exterior, a screw-cap screwed onto the said neck having a nozzle whose inner periphery is in alinement with the inner periphery of the tube, the lower end of said tube having a beveled edge and the inner end of the said nozzle having a beveled edge corresponding with the beveled end of the said tube, said screw-cap being adjustable on said neck whereby it may be adjusted to form an annular passage from the chamber surrounding said tube into said nozzle and whereby said annular passage may be varied in size or may be entirely closed at will.

9. A valve-controlled device for drawing liquid from a reservoir comprising a hollow valve-body having a tubular inlet connection with the reservoir and a tubular return connection with the reservoir whereby there is always a free circulation from the reservoir to the chamber of the valve-body and through said chamber back to the reservoir, said valve-body having an opening at the top connected with a tube which extends downward through the chamber of said valve-body, a cap secured to the lower end of said valve-body having a nozzle which has an opening in alinement with the passage through said tube in the valve-body, said cap being adapted to be secured to the valve-body in such manner as to leave a passage into the nozzle from the chamber of the valve-body surrounding said tube between the adjacent ends of said tube and nozzle and a valve movable within said tube and nozzle which is adapted to close and open said passage.

In testimony whereof I affix my signature, in presence of two witnesses.

GEORGE A. ROBINSON.

Witnesses:
WILLIAM A. COPELAND,
ALICE H. MORRISON.